(12) United States Patent
Chao et al.

(10) Patent No.: US 6,195,184 B1
(45) Date of Patent: Feb. 27, 2001

(54) HIGH-RESOLUTION LARGE-FIELD-OF-VIEW THREE-DIMENSIONAL HOLOGRAM DISPLAY SYSTEM AND METHOD THEREOF

(75) Inventors: Tien-Hsin Chao, Valencia; Frederick W. Mintz, Canoga Park; Peter Tsou; Nevin A. Bryant, both of La Canada, all of CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/336,542

(22) Filed: Jun. 19, 1999

(51) Int. Cl.[7] .............................. G03H 1/22; G03H 1/26; G03H 1/30; G03H 1/08
(52) U.S. Cl. .............................. 359/32; 359/22; 359/23; 359/24; 359/9; 359/33
(58) Field of Search .............................. 359/22, 23, 24, 359/25, 26, 32, 9, 33; 345/30

(56) References Cited

U.S. PATENT DOCUMENTS

| | | |
|---|---|---|
| 4,402,927 | 9/1983 | von Dardel et al. . |
| 4,610,863 | 9/1986 | Tewari et al. . |
| 4,994,672 | 2/1991 | Cross et al. . |
| 5,086,085 | 2/1992 | Pekala . |
| 5,111,313 | 5/1992 | Shires . |
| 5,119,214 | 6/1992 | Nishii et al. . |
| 5,242,647 | 9/1993 | Poco . |
| 5,294,480 | 3/1994 | Mielke et al. . |
| 5,347,644 | 9/1994 | Sedlmayr . |
| 5,400,155 | 3/1995 | Ueda et al. . |
| 5,483,364 | 1/1996 | Ishimoto et al. . |
| 5,561,537 | 10/1996 | Aritake et al. . |
| 5,570,208 | 10/1996 | Kato et al. . |
| 5,594,559 | 1/1997 | Sato et al. . |
| 5,644,324 | 7/1997 | Maguire, Jr. . |
| 5,644,414 | 7/1997 | Kato et al. . |
| 5,717,509 | 2/1998 | Kato et al. . |
| 5,724,162 | 3/1998 | Garcia et al. . |
| 5,739,812 | 4/1998 | Mochizuki et al. . |
| 5,748,382 | 5/1998 | Maguire, Jr. . |
| 5,818,400 | * 10/1998 | Nagan ...................................... 345/30 |
| 5,926,294 | * 7/1999 | Sato et al. ............................... 359/22 |

* cited by examiner

*Primary Examiner*—Audrey Chang
(74) *Attorney, Agent, or Firm*—John H. Kusmiss

(57) ABSTRACT

A real-time, dynamic, free space-virtual reality, 3-D image display system which is enabled by using a unique form of Aerogel as the primary display media. A preferred embodiment of this system comprises a 3-D mosaic topographic map which is displayed by fusing four projected hologram images. In this embodiment, 4 holographic images are projected from 4 separate holograms. Each holographic image subtends a quadrant of the $4\pi$ solid angle. By fusing these four holographic images, a static 3-D image such as a featured terrain map would be visible for 360 degrees in the horizontal plane and 180 degrees in the vertical plane. An input, either acquired by 3-D image sensor or generated by computer animation, is first converted into a 2-D computer generated hologram (CGH). This CGH is then downloaded into large liquid crystal (LC) panel. A laser projector illuminates the CGH-filled LC panel and generates and displays a real 3-D image in the Aerogel matrix.

12 Claims, 2 Drawing Sheets

HIGH-RESOLUTION LARGE-FIELD-OF-VIEW THREE-DIMENSIONAL HOLOGRAM DISPLAY SYSTEM AND METHOD THEREOF

ORIGIN OF THE INVENTION

The invention described herein was made in the performance of work under a NASA contract, and is subject to the provisions of public law 96-517 (35 USC 202) in which the contractor has elected not to retain title.

TECHNICAL FIELD

The present invention relates generally to three-dimensional (3-D), hologrammetric display of objects (photographed or reconstituted by computer graphics) in a display matrix such that a dynamic scene can be viewed from any angle in the x, y or z axes. The invention relates more specifically to the display of 3-D map products for strategic or tactical planning to enhance the ability of commanders and their support staff to understand and exchange command and control information; particularly with respect to Battlefield Visualization.

BACKGROUND ART

Prior to the present invention, viewers of (so called) three-dimensional (3-D) holograms were required to view the reflected image(s) within the line-of-sight range of a holographic projection plate. If the viewer's eyes were moved out of the narrow range of the reflected images, the image would "disappear". In essence, the viewer's eyes were the "display medium" for the hologrammetric images.

Real time, 3-D image display has been the focus of many development efforts. However, the lack of an ideal display medium and apparatus has been the primary limiting factor for obtaining a practical system. For example, conventional holograms (e.g. dichromated gelatin hologram) are able to display a real or virtual 3-D image with only a limited perspective angle. A 3-D image could also be viewed by projecting polarization-encoded stereo images on a large screen or TV monitor. However, the fact that viewer has to wear polarizing goggles, with a narrow field of view, severely limits its visualization applications. Recently, a 3-D image display technique using a laser scanner and rotation screen has been developed (Texas Instrument). In operation, a scanning laser beam is synchronized with a 3-D rotating diffusive screen to display a time-multiplexed 3-D image. The volume of this displayed image is limited due to the need of spinning a large screen at a high speed.

A search of the prior art has resulted in the following patents of some relevance to the present invention:

| | |
|---|---|
| 4,402,927 | von Dardel et al |
| 4,610,863 | Tewari et al |
| 4,994,672 | Cross et al |
| 5,086,085 | Pekala |
| 5,111,313 | Shires |
| 5,119,214 | Nishii et al |
| 5,242,647 | Poco |
| 5,294,480 | Mielke et al |
| 5,347,644 | Sedlmayr |
| 5,400,155 | Ueda et al |
| 5,483,364 | Ishimoto et al |
| 5,561,537 | Aritake et al |
| 5,570,208 | Kato et al |
| 5,594,559 | Sato et al |
| 5,644,324 | Maguire, Jr. |
| 5,644,414 | Kato et al |
| 5,717,509 | Kato et al |
| 5,724,162 | Garcia et al |
| 5,739,812 | Mochizuki et al |
| 5,748,382 | Maguire, Jr. |

Of the foregoing, the following appear to be of greater relevance:

U.S. Pat. No. 5,347,644 to Sedlmayr is directed to a three-dimensional image display device and systems and methods for implementation. The three-dimensional image display device has a projection screen 175 as shown in FIG. 5. The projection screen display device has multiple layers of transparent material each with a unique coating. A beam of collimated white light 50 has the infrared energy removed and the resultant beam 55 is processed as shown in FIG. 4 by splitting the beam, filtering it, and passing it through a liquid crystal device acting as a PEMFVORFD, a programmable electromagnetic wave field orientation rotating device. The coating on the various layers 200, 202, 204 . . . of the display device each is reflective to an electric field vector that has an orientation at a specific angle. With the beam passing through the transparent layers, the selective reflection of the layers provides a solid image for display.

U.S. Pat. No. 5,111,313 to Shires is directed to a real time electronically modulated cylindrical holographic auto stereoscope that can display a three-dimensional image over a 360 degree viewing area without using special glasses, the display being in real time from remotely gathered images. Eight laser diodes 15 each with a collimating lens 16 project a beam 20 through a common cylindrical lens 17 through a slit 18 and onto a cylindrical HOE (hologram optical element) 10. The HOE has eight raster scan tracks 11, each track having thousands of contiguous holograms. The laser beams 20 fall on subsequent HRS holograms as the HOE is rotated with the beam being diffracted at different predefined angles. The beam then defines pixels on a holographic direction selective screen 13. As the HOE 10 is spun on its axis of symmetry by motor 14, different holograms on different portions of the corresponding HRS track 11 can be sequentially reconstructed by light beam 20 and illuminated on HDSS holograms 13. A particular sequence of scanning pixels can vary greatly, as long as each horizontal viewing zone is presented with one complete unique raster scan. An audience around the HOE can see any given pixel as it is scanned horizontally, but it produces a vertical line image. Thus, vertical movement on the part of the viewer will not provide a new perspective.

U.S. Pat. No. 5,086,085 to Pekala is directed to processing Aerogels that are transparent, essentially colorless and exhibit continuous porosity and ultra fine cell size. The aqueous sol-gel polymerization of malamine with formaldehyde, followed by super-critical extraction leads to the formation of the new type of organic Aerogel. The formation followed by super-critical drying produces the improved Aerogels. The transparent silica Aerogel formed by this inventive process can be sheets or slabs that have substantially better optical and structural characteristics compared to conventional processing. The process of forming these Aerogels is the same except for an improved super-critical drying process using a solvent such as $CO_2$. Using this drying process provides higher process yields, reduced processing time and structurally sound Aerogels.

U.S. Pat. No. 5,739,812 to Mochizuki et al is directed to a system for inputting image and commands using a three-dimensional mouse capable of generating in real-time a three-dimensional image. The three-dimensional system has a radiation source 10 with oscillator 11 and dipole antenna 13, with a radiation controlling switch 15. A two-dimensional microstrip antenna unit 16 with a plurality of elements 23 is capable of receiving the electromagnetic wave within the frequency range of 100 MHZ to 50 Ghz so as to select a frequency of the hologram. The size of the antenna array 16 is substantially equal to a size of a three-dimensional object, a space in which the transmitting dipole antenna 23 is moved. The signal from the antenna is sent to the hologram data collecting circuit 17. A holder of the transmitting dipole antenna 13 movable in the three-dimensional directions defines the virtual space which is produced by the system. A command inputting unit 21 held by the hand of the operator inputs signals to the host computer. Host computer 20 responds to these signals as well as the data obtained from the transmitting dipole antenna 13's movement. A stereoscopic unit 22 mounted on the head of the operator displays a point image, a line image and a three-dimensional image, in response to the data from the computer 20.

STATEMENT OF THE INVENTION

By implementing the present invention, viewers would no longer be restricted to direct line-of-sight, hologram plate reflections, but would be able to view a projected 3-D hologram from any position in a room. In essence, a 3-D scene appears in free space, virtual reality. Further, images could be constructed from relatively static data (i.e., terrain features) with a dynamic data overlay (i.e. vehicle locations and unit movements).

A key application of this 3-D display technology in support of Battlespace Visualization, is its potential to accurately portray threat envelopes from enemy radars or other observing systems. Presently, radar threat and line-of-sight models identify areas that are illuminated or shadowed by terrain, but only for the 2-D case (i.e. height of the observer and potential target is fixed). A 3-D rendition will more fully portray the real impact of terrain shadowing upon multiple search fans, thereby revealing potential areas of undetected movement. For friendly forces, the 3-D display will provide a comprehensive collection management and asset management tool that assures complete, or the most effective coverage, in regions of moderate or high relief. This invention is implemented by the use of a pure form of silica Aerogel as the display medium for 3-D holograms. This innovative display technique may lead to a number of new military and commercial applications.

The present invention comprises a real-time, dynamic, free space-virtual reality, 3-D image display system which is enabled by using a unique form of Aerogel as the primary display media. A preferred embodiment of this system comprises a 3-D mosaic topographic map which is displayed by fusing four projected hologram images. In this embodiment, 4 holographic images are projected from 4 separate holograms. Each holographic image subtends a quadrant of the $4\pi$ solid angle. By fusing these four holographic images, a static 3-D image such as a featured terrain map would be visible for 360 degrees in the horizontal plane and 180 degrees in the vertical plane.

Three-Dimensional data is first converted into holographic fringes using computer generated hologram algorithms (CGH). In order to display a full-color output, separate holographic fringes are computed corresponding to each of the three primary colors red, green and blue. Each color holographic fringe is then downloaded to a three channel binary spatial light modulator (SLM). The SLM is capable of displaying a 512×512 pixel holographic fringe at a frame rate of 1,000 frames/sec. Therefore, the large two-dimensional holographic fringes are partitioned into many 512×512 consecutive segments and sequentially downloaded into the SLMs. The time multiplexed holographic fringes are read out by three lasers of red, green and blue and imaging into the output plane through a vertical scanner and a horizontal scanner. The vertical scanner uses a galvanometer scan and the horizontal scanner uses a rotating polygon mirror. In the output plane, a large mosaic holographic image which is the same as the original CGH is reconstructed through spatially recombining all of the 512×512 holographic fringes. An output lens is placed behind the mosaic holographic image to provide the viewer a virtual image visualized behind the holographic plane or a real image visualized in front of the holographic plane. For direct viewing applications, a virtual image can be visualized within a 30 degree viewing zone. However, with implementation of an Aerogel-based display matrix, a real holographic image is generated and projected into the Aerogel enabling a large viewing zone of 360 degrees in the horizontal dimension and 180 degrees in the vertical dimension.

Silica Aerogel is essentially an open cell glass foam with extremely fine mesostructure. The cellular dimension is in the range of 100 Å. The chemical composition is similar to quartz but the density can be an order of magnitude less. The Aerogel used herein has very high transparency (greater than 80%). Unlike quartz, a light beam is visible within Aerogel due to scattering and reflections.

Monolithic Aerogel is produced by a batch process and is limited in size by current process equipment and practices. With existing processing equipment, a 10 cm$^3$ cube has been produced. With proper equipment and process development, larger monoliths will be possible. The backscattering efficiency of the Aerogel should be as high as possible to enhance the angular visibility of the 3-D hologram displayed in an Aerogel matrix.

While computer generation of 3-D images has been demonstrated, overcoming the matrix problem has been elusive until now. The present invention uses a form of Aerogel to provide the necessary "solid air" medium, thus solving this vexing problem. Providing the capability to view the dynamic motion projection of 3-D images downloaded in real-time from ground, airborne and spaceborne sensor platforms will usher in a new dimension of information understanding.

OBJECTS OF THE INVENTION

It is therefore a principal object of the present invention to provide a real-time, dynamic, three-dimensional holographic image display system in which a scene can be viewed from any angle relative to three orthogonal axes.

It is another object of the invention to provide a viewing system for three-dimensional holographic image displays where the image can be viewed from substantially any relative position.

It is still another object of the invention to provide a dynamic, three-dimensional holographic image system in which the display comprises a three-dimensional, transparent Aerogel matrix.

It is yet another object of this invention to provide a holographic viewing system for battlefield visualization wherein an Aerogel cube is used to provide a three-dimensional image of a battlefield scene.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
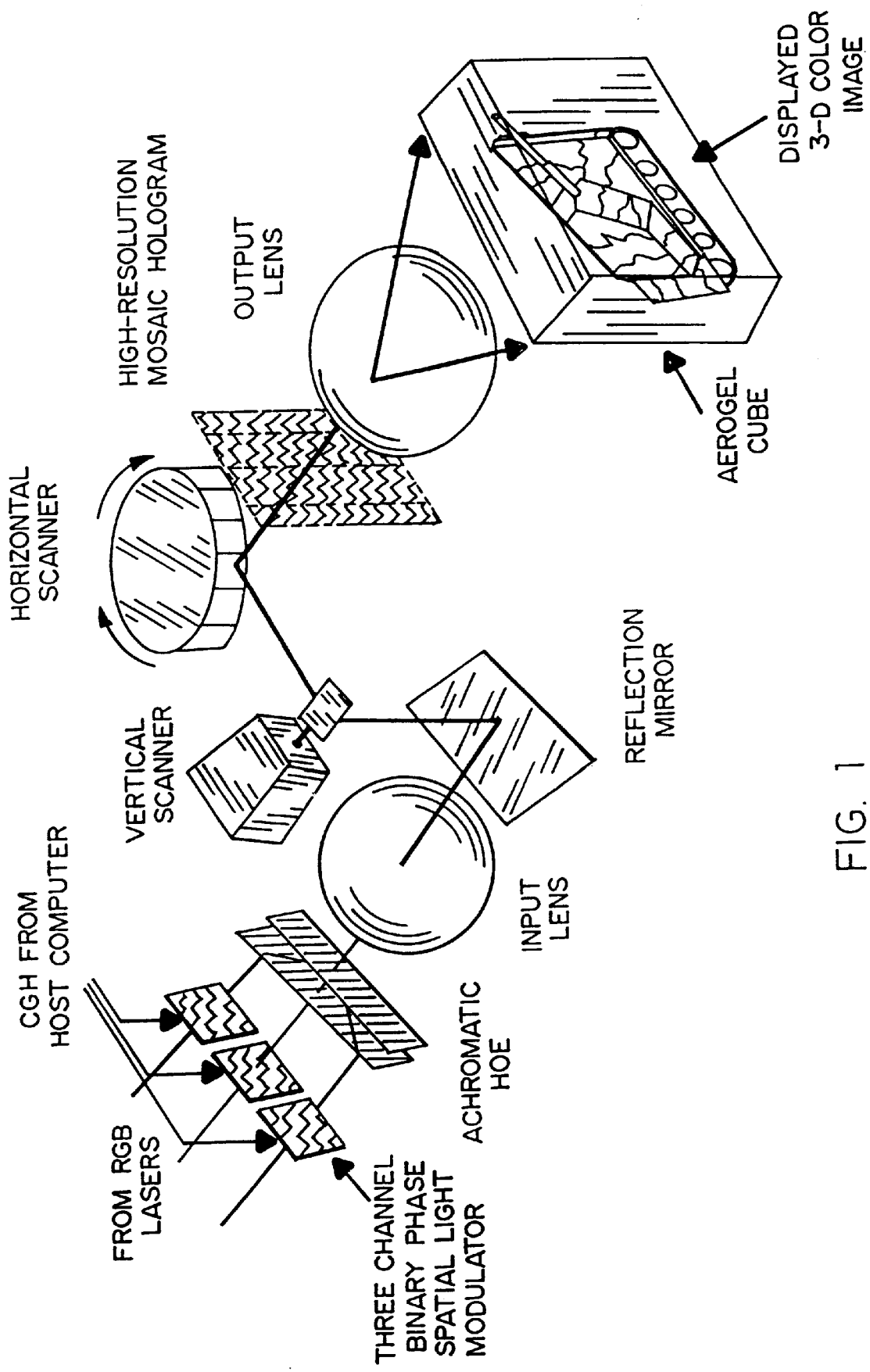
FIG. 1 is a block diagram of a preferred embodiment of the invention.

Referring to FIG. 1, it will be seen that a display system in accordance with the present invention comprises a three-channel binary phase, spatial light modulator, an achromatic HOE, an input lens, a mirror, a vertical scanner, a horizontal scanner, an output lens and an Aerogel display medium. The holographic source shown in FIG. 1 comprises a computer generated hologram (CGH) from a host computer. The CGH is used as a modulation signal to a set of spatial light modulators through which respective red, green and blue reference laser light is transmitted. The spatial light modulators are liquid crystal devices having a two-dimensional array of individually modulated pixels, each capable of numerous discrete levels of transmissivity depending upon the modulation level.

The output of the three channel spatial light modulator is applied to an achromatic hologram optical element (HOE) which is, in effect, an optical combiner providing a unitary colored holographic optical signal with a changing content depending upon the modulation applied to the spatial light modulators. The output optical signal of the HOE is then applied to an optical beam assembly comprising an input lens, a mirror, two orthogonal scanners and an output lens. The function of the optical beam assembly is to produce a high resolution mosaic hologram before applying that mosaic hologram to a display medium. The input lens collimates the holographic optical signal. The mirror reflects the collimated beam onto a vertical scanner and a horizontal scanner in sequence. The two orthogonal scanners are designed to create a time-multiplexed two-dimensional array or mosaic hologram, much like a TV image is achieved by horizontal and vertical scanning of a video modulated electron beam. However, in the system of FIG. 1, the beam is an optical or light energy beam carrying a modulated holographic image based upon the content of the CGH. This mosaic is applied through an output lens to the display medium.

In the preferred embodiment of the present invention, the display medium comprises a block of Aerogel. The Aerogel block will be contained in a transparent container of a desired shape. In the preferred embodiment, the selected shape is a solid rectangle about the size of a large home aquarium tank. The container may be made of a highly transparent plastic with extremely thin walls.

The Aerogel itself is preferably formed of silica as an open cell glass foam with an extremely fine mesostructure. The physical properties of Aerogel include a density of as low as 0.003 grams/cc and an internal surface area of as high as 1000 $m^2$/gram and an index of refraction of 1.0 to 1.05. Further information regarding Aerogel may be obtained at the Aerogel Web Page of NASA (http://www.aerogels.com/) and other sites referred to therein.

Figure 2:
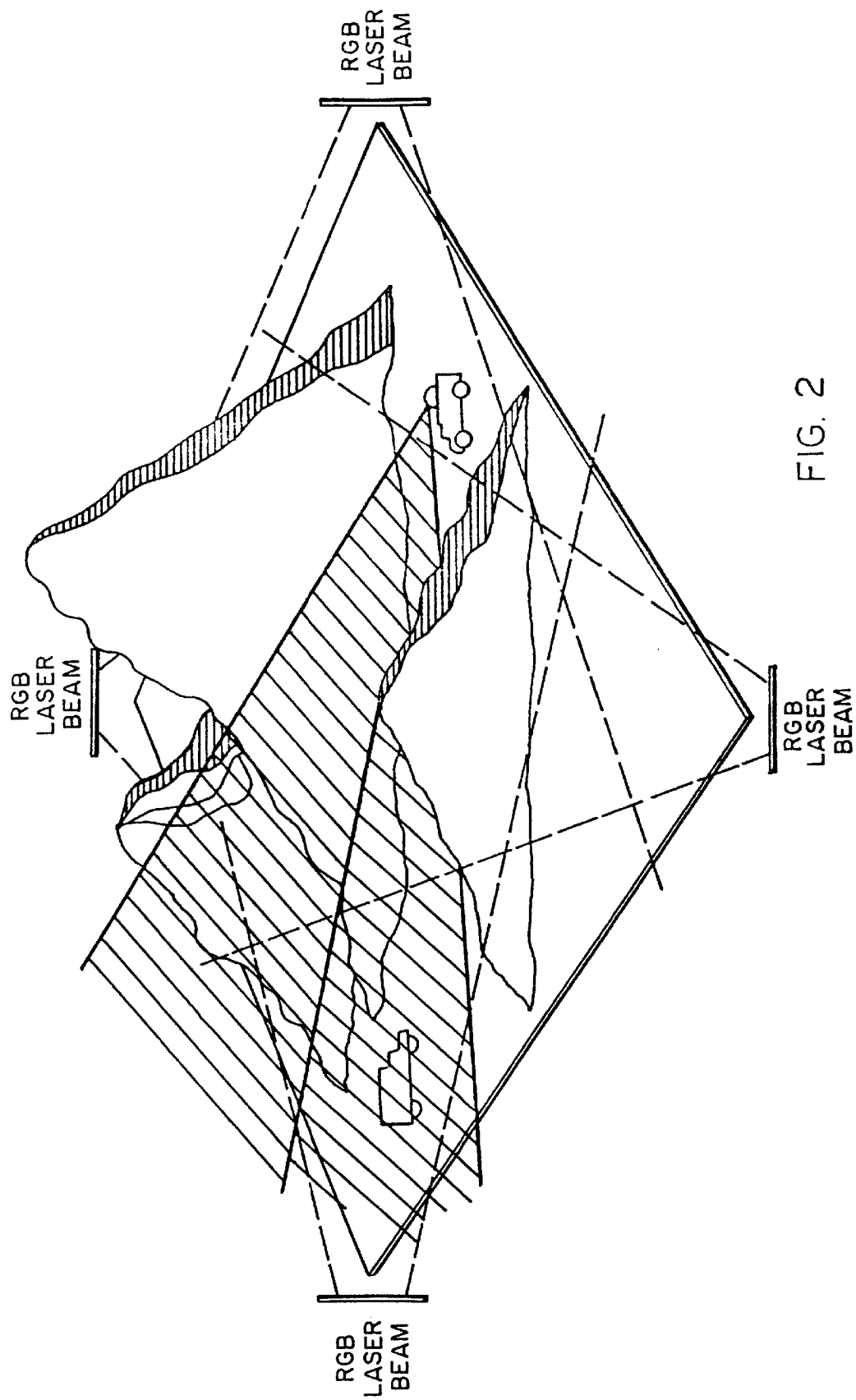
FIG. 2 is a system schematic diagram of a three-dimensional terrain display using a four-quadrant mosaic hologram.

Other mosaic configurations may be implemented depending upon the application. FIG. 2 depicts a three-dimensional terrain display comprising a four quadrant mosaic hologram wherein the location of friendly and/or hostile vehicles are shown dynamically against a static terrain background. Each quadrant mosaic is generated in the manner described above in conjunction with FIG. 1. The source of the Battlefield data may be real time video cameras, the output of which are fed to a computer which generates a dynamic holographic image from each camera's perspective. The holographic image may include the static terrain features which are blended together to form an accurate reproduction from all available data sources. The dynamically changing aspects of the image may be derived from other than video cameras, such as radar or infrared sensors. In any case, the image formed in the Aerogel may be viewed simultaneously from any direction above the plane of the terrain substrate and provide a true three-dimensional representation of the battlefield under dynamically changing conditions.

Having thus described a preferred embodiment of the invention, it being understood that the disclosure herein is only exemplary and not necessarily limiting of scope, what is claimed is:

1. A three-dimensional holographic image display system comprising:

a source of holographic image data;

at least one spatial light modulator connected for being modulated by said image data;

a source of reference light transmitted through said modulator to be attained in accordance with said modulating image data and forming a dynamically alterable holographic light signal;

a pair of orthogonal scanners positioned for receiving said holographic light signal and sequentially projecting said light signal in two orthogonal directions for generating a time-multiplexed mosaic of the holographic light signal over a selected two-dimensional field of view; and an Aerogel matrix display medium configured as a three-dimensional, substantially transparent block and positioned for intercepting said mosaic for observing said holographic image from substantially all directions.

2. The display system recited in claim 1 wherein said source of holographic image data comprises a computer programmed to generate hologram data corresponding to an image.

3. The display system recited in claim 1 wherein said modulator comprises an array of liquid crystal pixel elements, each such element being independently responsive to a modulation signal for controlling the light transmissivity of the element.

4. The display system recited in claim 1 wherein said scanners comprise at least one rotating member having a plurality of contiguous mirrored facets for scanning along at least one of said two orthogonal directions.

5. The display system recited in claim 1 wherein said Aerogel matrix display medium comprises a generally solid, rectangularly shaped quantity of silica-based Aerogel matrix formed within a correspondingly shaped container and wherein said Aerogel and said container are substantially transparent.

6. The display system recited in claim 1 wherein said system comprises a plurality of said spatial light modulators for generating a color holographic image display.

7. A method of generating a three-dimensional holographic image display; the method comprising the steps of:
   a) generating holographic image data;
   b) applying said data as modulation to at least one spatial light modulator;
   c) transmitting a reference light through said modulator in accordance with said modulation and forming a dynamically alterable holographic light signal;
   d) applying said holographic light signal to two-dimensional scanners for sequentially projecting said light signal in two orthogonal directions to form a time-multiplexed mosaic of the holographic light signal over a selected two-dimensional field of view; and
   e) projecting said mosaic into an Aerogel matrix display medium configured as a three-dimensional, substantially transparent block for observing said holographic image from substantially all directions.

8. The method recited in claim 7 wherein step a) comprises the step of calculating holographic fringe data from an image.

9. The method recited in claim 7 wherein said spatial light modulator comprises an array of liquid crystal pixel elements, each such element being independently responsive to a modulation signal for controlling the light transmissivity of the element.

10. The method recited in claim 7 wherein said two-dimensional scanner comprises at least one rotating member having a plurality of contiguous mirrored facets for scanning along at least one of said two orthogonal directions.

11. The method recited in claim 7 wherein said Aerogel matrix display medium comprises a generally solid, rectangularly shaped quantity of silica-based Aerogel matrix formed within a correspondingly shaped container and wherein said Aerogel and said container are substantially transparent.

12. The method recited in claim 7 wherein in step b) said data is applied to a plurality of said spatial linear modulators for generating a color holographic image display.

* * * * *